March 11, 1958 H. A. WILLET 2,826,131
PIVOTED TOOL CARRIERS AND TOOL BARS THEREFOR
Filed Aug. 6, 1954 5 Sheets-Sheet 1

INVENTOR
H. A. Willet

BY Wilkinson Mawhinney
ATTORNEYS

March 11, 1958  H. A. WILLET  2,826,131
PIVOTED TOOL CARRIERS AND TOOL BARS THEREFOR
Filed Aug. 6, 1954  5 Sheets-Sheet 2
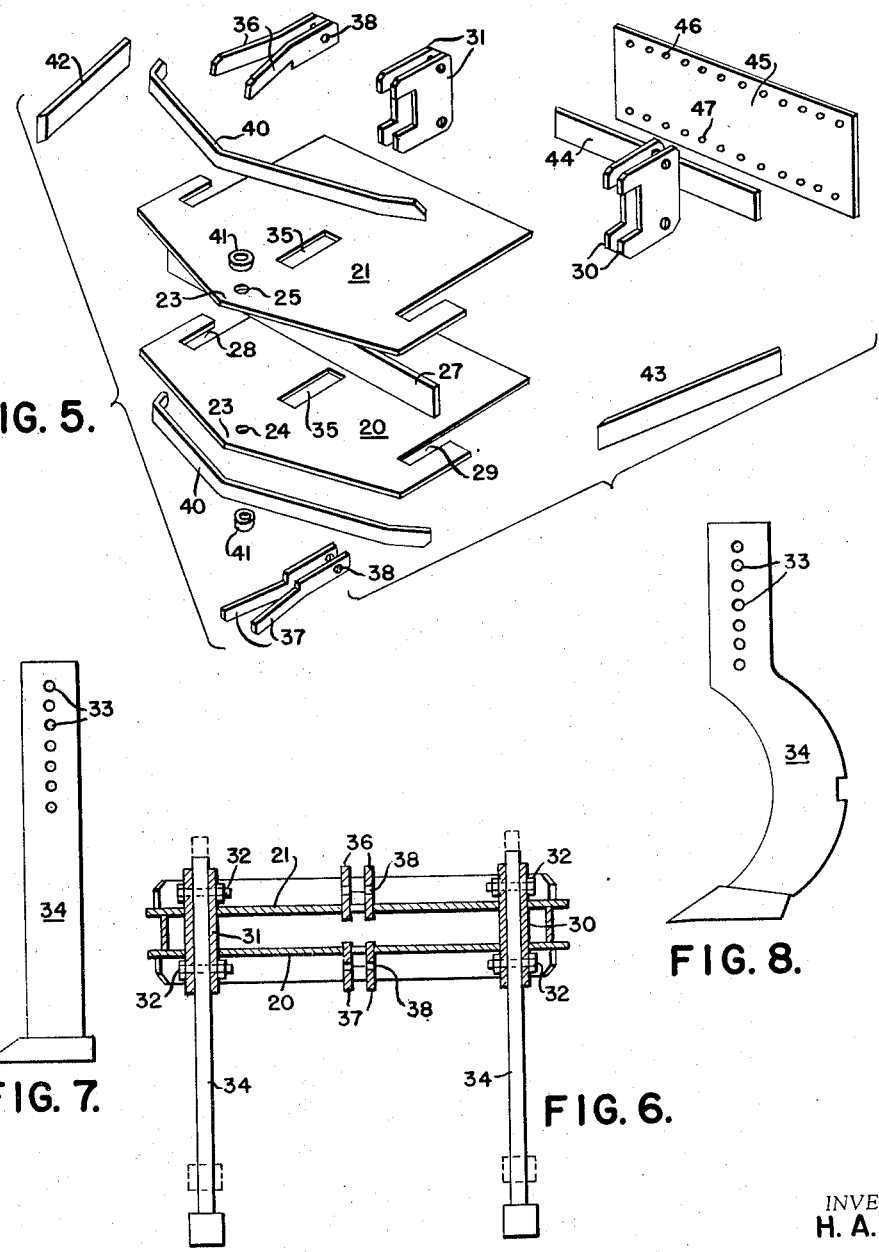
INVENTOR
H. A. Willet
BY Wilkinson Mawhinney
ATTORNEYS March 11, 1958      H. A. WILLET      2,826,131
PIVOTED TOOL CARRIERS AND TOOL BARS THEREFOR
Filed Aug. 6, 1954      5 Sheets-Sheet 4

INVENTOR
H. A. Willet
BY Wilkinson & Mawhinney
ATTORNEYS

March 11, 1958 H. A. WILLET 2,826,131
PIVOTED TOOL CARRIERS AND TOOL BARS THEREFOR
Filed Aug. 6, 1954 5 Sheets-Sheet 5

INVENTOR
H. A. Willet

United States Patent Office 2,826,131
Patented Mar. 11, 1958

2,826,131

PIVOTED TOOL CARRIERS AND TOOL BARS THEREFOR

Harold A. Willet, Aguirre, Guayama, Puerto Rico

Application August 6, 1954, Serial No. 448,353

3 Claims. (Cl. 97—47.66)

The present invention relates to pivoted tool carriers and tools bars therefor and has for an object to provide a carrier for earth working implements which may carry implements for doing two different soil working operations simultaneously and which may as a unit carry from one to five tool implements simultaneously.

A further object of the present invention is to provide a carrier which may be quickly attached and detached from a tool bar mounted on a tractor or the like and which, when attached and having its implements penetrating the soil, will not impart a "rudder effect" to the steering of the tractor.

Another object of the present invention is to provide a carrier which may be fitted with different tools quickly and which provides flexibility between the carrier and deep-penetrating tools.

A further object of the present invention is to provide a tool bar for carrying the tool carrier which may be pivotally mounted on the rear of a tractor for selectively raising or lowering the tool carrier for controlling penetation of the earth working implements in the ground.

A still further object of the present invention is to provide a tool bar of the divided type for carrying two of the tool carriers of this invention whereby each half of the tool bar while being subject to gang operation may be independently controlled for performing uniform work on hillsides or uneven terrain and in which upon an implement on one of the carriers striking an object, embedded in the earth and being deflected thereby the other carrier is unaffected thereby and remains on its tillage course.

A still further object of the invention is to provide a tool bar and carrier particularly adapted for use with a crawler type tractor in which steering is effected by braking the drive selectively to either the right or left crawler tread.

With the foregoing and other objects in view the invention will be more full described and pointed out in the following specification and drawings wherein like numerals refer to similar parts throughout all views and in which:

Figure 5 is an exploded perspective view of a pivoted tool carrier constructed in accordance with the present invention.

Figure 6 is a vertical transverse section taken on the line 6—6 in Figure 4.

Figure 7 is a side elevational view of a sub-soil implement adapted for use with the tool head of Figures 4 and 6.

Figure 8 is a side elevational view of another implement adapted for use with the pivoted tool head carrier of the present invention.

Figure 3:
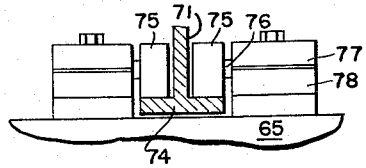
Figure 3 is a horizontal section taken on the line 3—3 in Figure 1.
Figure 4:
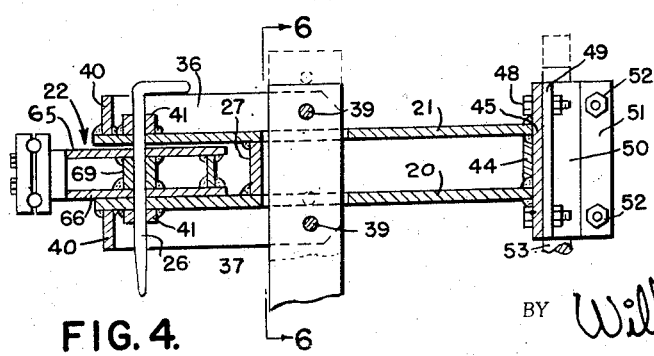
Figure 4 is a longitudinal vertical section taken through a pivoted tool carrier constructed in accordance with the present invention and having parts broken away and parts shown in dotted lines.

Referring more particularly to the drawings Figures 1 to 8 inclusive the tool or implement carrier will be described. In carrying out the operation the implement carrier must be pivoted to swing horizontally about a vertical pivot carried by an object movable through a field and such carrier must rigidly hold the implements attached thereto and it must also be capable of receiving and carrying from one to five implements for performing from one to three functions simultaneously during one pass of the implement carrier over the field. Such functions may be sub-soil, bank building and stubble shaving. A form of such an implement carrier may consist of a bottom and top plate 20, 21 adapted to over and under lie a draw bar 22 as best seen in Figure 4. The plates 20, 21 have a triangular leading end or apex 23 proximate which there are holes 24, 25 for receiving the pivot pin 26 for securing the implement carrier to the draw bar 22. The top and bottom plates 20, 21 are joined by a front spacer 27 welded or otherwise secured to the plates 20, 21 at a point rearwardly of the base angles of the triangular leading end of the carrier. The plates 20, 21 are provided at each side with slots 28, 29 in vertical registry for receiving therein guide attaching plates 30, 31 which are welded to the plates 20, 21 as best seen in Figure 6, having openings therethrough in horizontal registry for receiving retaining bolts 32 passing through openings 33 in the shank of an implement 34 to be carried by the carrier. Proximate the center line of the plates 20, 21 and at a point rearwardly of the pivot holes 24, 25 there are slots 35 in vertical registry, which slots are bordered by guide attaching flanges 36, 37 welded to the top and bottom plates and being adapted to receive therebetween the shank of an implement and having openings 38 therethrough to receive the retaining bolts 39 which pass through the shank of the implement. Shields 40 are provided on each of the plates 20, 21 at their leading ends for acting both as a dirt shield and strengthening member. These shields 40 are welded to the plates.

The guide attaching flanges 36, 37 are divergent towards the front of the plates 20, 21 to permit securing of pivot bosses 41 to the plates 20, 21 as by welding.

These bosses 41 act as guides and bearings for the pivot pin 26, as best seen in Figure 4.

Figure 2:
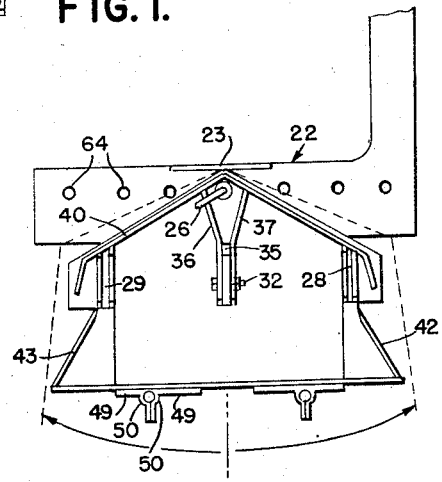
Figure 2 is a top plan view of the pivoted tool carrier constructed in accordance with the present invention.

The bottom and top plates 20, 21 are joined along their sides by end plates 42, 43 which are welded to the bottom and top plates 20, 21 and which lie slightly inwardly of the edges of the plates, as best seen in Figure 2.

At the rear of the head or implement carrier, the plates 20, 21 are joined by a spacer rear plate 44 as by welding. The rear end of the rear plate 44 is flush with the ends of the bottom and top plates 20, 21 to permit welding thereto of a disc attaching plate 45, as best seen in Figure 4. This plate 45 is provided with two horizontal series of openings 46, 47 receiving therethrough bolts 48 for securing clamp plates 49 thereto. The clamp plates 49 are each provided with a semi cylindrical clamp 50 and flange 51 joined by bolts 52 for clamping the stub support 53 of a disc assembly therebetween. Each clamp plate 49 is provided with a pair of arcuate slots 54 for receiving the bolts 48 therethrough.

As will be seen from the above, the construction of the implement shanks 34, guide attaching flanges 36, 37 and 30, 31 permits the shanks to be adjusted vertically with respect to the carrier. The same type of adjustment can be obtained with the disc stub supports 53 within the clamps 50 carried by the clamp plates 49. However, the axes of the disc stub supports 53, may also be inclined transversely of the carrier due to the presence of the arcuate slots 54 in the clamp plates 49. The adjustments permit a varying of the degree of soil penetration by the various implements for carrying out their desired functions. In the case of discs the assembly may also be rotated about the vertical axis of the stub support 53 as well as inclined. When the discs are positioned with their cutting planes longitudinal to the line of draft of the carrier and substantially vertical thereto, penetration will be the deepest. By varying the axis of transverse inclination and the rotation of the stub axis 53 the discs can be effectively made into a wedge in the shape of a V. The larger the angle of the apex of the V, the more shallow will be the penetration.

Figure 14:
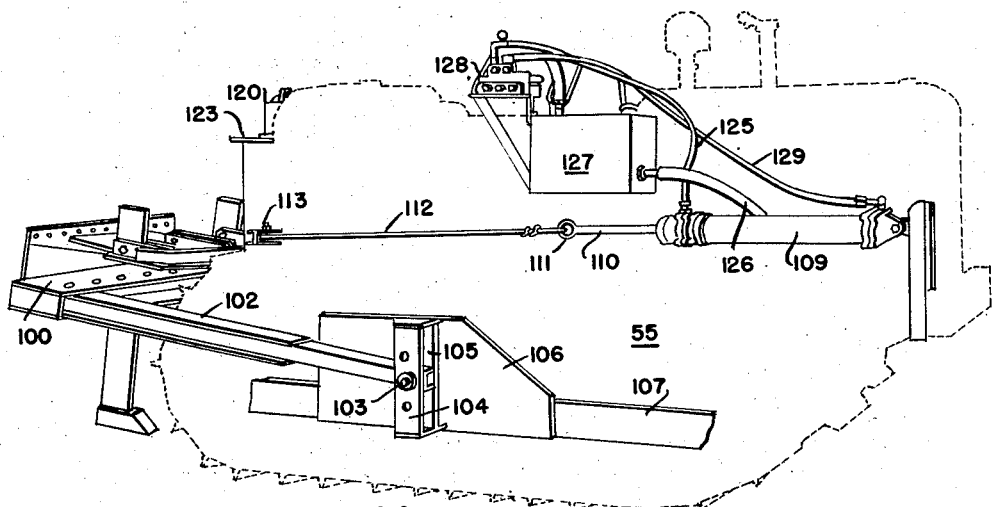
Figure 14 is a front perspective view showing the single tool bar type installation on a crawler tractor and also showing the elevating mechanism therefor.

When the carrier employs only sub-soilers, Figures 7 and 14, the depth of penetration may be controlled to some extent by its positioning between the guide attaching flanges, if shallow penetration is desired the shank of the sub-soiler is raised to the dotted line position of Figure 6. However, when discs are employed in addition to the sub-soiler, they may control the depth of penetration as described above.

The implement carrier may be outfitted with sub-soilers, a winged plow and disc assemblies for performing three operations simultaneously such as sub-soiling, plowing and bank forming particularly in connection with the farming of sugar cane.

As set out above it is important that there be a restricted degree of horizontal swinging movement permitted in the drawing of the implement carrier along a field in order to permit the implements upon striking objects embedded in the soil to ride around the same. If the implement, its carrier and draft member were rigid the implement would be damaged and such rigidity would impart a "rudder" effect to the drawing member disturbing the line of draft of the implements. The degree of restricted movement may be obtained by pivotally connecting the carrier to the draft means which is normally a draw bar drawn by a tractor and pivoted thereto for vertical elevation which will not only permit the implement to ride around the object but it will also have enough flexibility to in some instances ride up and over the object contacted thereby imparting a universal movement to the tool or implement carrier.

In practice it has been found that an implement carrier constructed as above described is most effectively employed with a crawler type tractor. There are two species of crawler tractor for which the embodiments illustrated are adapted, they are the small type 5 ton crawler known as the HD5 manufactured by Allis-Chalmers of Milwaukee, Wisconsin illustrated in Figures 13 and 14 and the larger HD9, a 9 ton tractor as illustrated in Figures 9 through 12 inclusive. The smaller tractor HD5 is fitted out with a single or unitary draw bar 22 while the larger tractor HD9 is fitted out with a split type draw bar 22.

Figure 1:
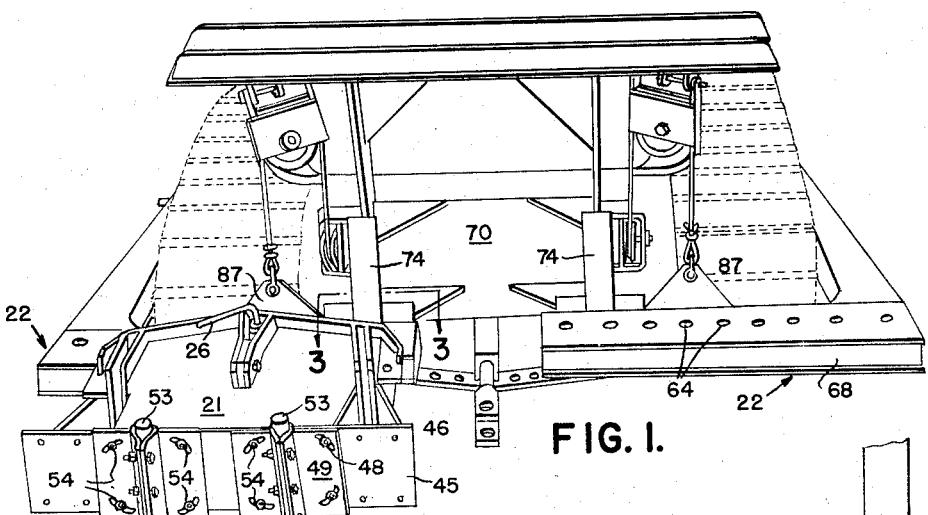
Figure 1 is a rear fragmentary perspective view of a crawler type tractor having a pivoted tool carrier mounted on the rear thereof and being constructed in accordance with the present invention.
Figure 9:
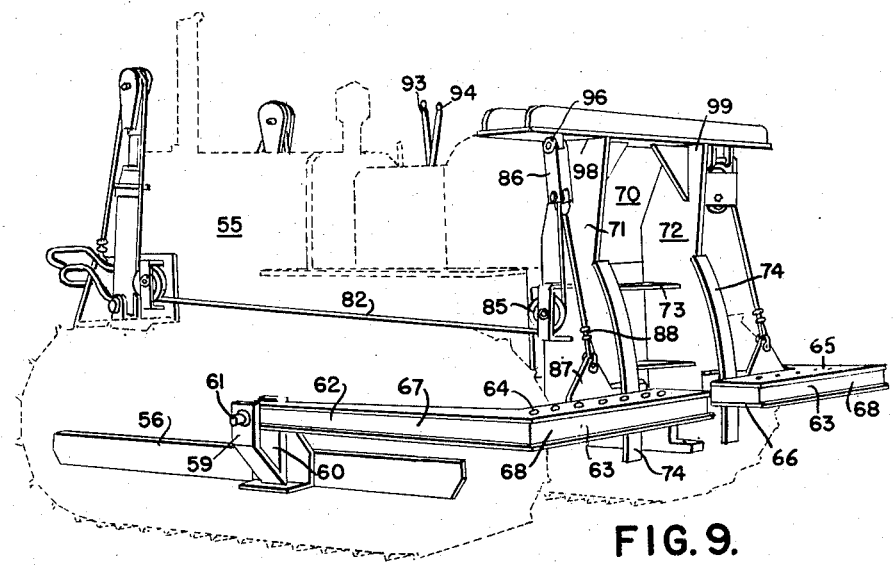
Figure 9 is a perspective view of a crawler type tractor having mounted thereon a split type tool bar adapted to carry the pivoted tool carrier of the present invention.
Figure 10:
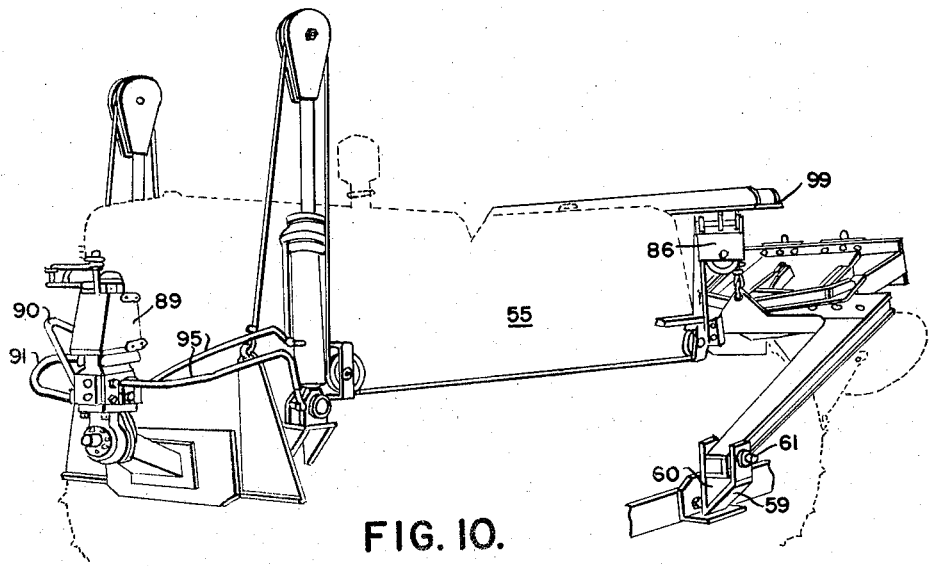
Figure 10 is a fragmentary perspective view of the tractor shown in Figure 9 having the pivoted tool bar attached to the rear thereof and showing the elevating mechanism for the split type tool.

The split type draw bar for use with an HD9 tractor will first be described. Referring to Figures 1 through 3 and 9 through 12, 55 designates generally a crawler type tractor having the conventional truck frame 56 to which a draw bar pivot support 57 is adapted to be bolted as at 58. The support 57 has two spaced apart plates 59, 60 which journal a pivot pin 61 which passes through one end of the leg 62 of a generally L-shaped half draw bar unit. The L-shaped unit in addition to the leg 62 has a foot portion 63 of a greater width than the leg 62. The foot portion 63 is provided with a series of in line openings 64, as best seen in Figures 1 and 2. As shown in Figure 4 the pivoted L-shaped arm consists of two plates 65, 66 in juxtaposed relation and being joined by side and end plates 67, 68 welded thereto. The openings 64 are formed in both plates 65 and 66 and the openings in the two plates are in vertical alignment with each other. Located in the foot 63 of the L-shaped pivot arm, lying between the two plates 65, 66 and having their internal diameters in registry with the openings 64 are guide bearings 69 through which may pass the pivot pin 26. The annular guide bearings not only aline the pin 26 with the openings 64 in plates 65, 66 but also distribute the pull load surface area over a greater length of the pin to prohibit shearing from wear. Two of the above described assemblies are provided for each HD9 or split draw bar application with the toes of each foot member 63 being directed inwardly toward the longitudinal axis of the tractor. The provisions of a plurality of openings 64 in the foot 63 permits the implement carrier to be pivoted to each half of the draw bar at any one of the openings 64 for attaining the desired displacement from the longitudinal axis of draft of the implement carrier. Due to the weight of the implement carrier and implements attached thereto it has been found in practice advantageous to provide a roller stabilizer guide for the free ends of the foot members 63. One form of such a guide may consist of a back plate 70 adapted to be bolted to the rear end of this HD9 crawler type tractor and which has rearwardly off standing plates 71, 72 welded thereto and reinforced by webs 73. The lower portions of plates 71, 72 are struck on an arc taken with the pivot pin 61 as its center and an arcuate strip 74 is welded to the lower arcuate portion of each plate 71, 72, as best seen in Figures 3 and 9. The arc of each strip plate 74 is also struck with pivot pin 64 as its center and the transverse width of each strip plate 74 is greater than the width of its associated plate 71, 72, as best seen in Figure 3, whereby the overhang forms a roller guide track on each side of its plate over which rollers 75 each carried by a roller shaft 76 are free to roll. Each roller shaft 76 is held between two clamp plates 77, 78 one of which is secured to the inside portion of the foot 63 of the draw bar. This stabilizer roller guide cooperates with the pivot support 61 of the split draw bar, the pivot pin 26 joining the implement carrier to the foot 63 and the spacer plate 27 of the implement carrier whereby upon one of the implements striking an object embedded in the earth and causing the carier to be pivoted to the left as shown by the arrow in Figure 2, the spacer plate 27, best seen in Figure 4, will be brought into engagement at its left end with the end plate 68 of the draw bar which, in Figure 1, would tend to bend the foot 63 rearwardly and outwardly of the tractor setting up deformation moments in the L-shaped member. This is prohibited by the roller guide stabilizer on the free end of the foot 63 which transfers the load between the rollers 75, plates 74, 71 and the tractor frame on one side and the pivot pin 61, pivot support 57 and truck frame 56. While only one of the members of the split draw bar construction has been described in detail it will be appreciated that there are two and that each is constructed and operates similar to the other.

Figure 11:
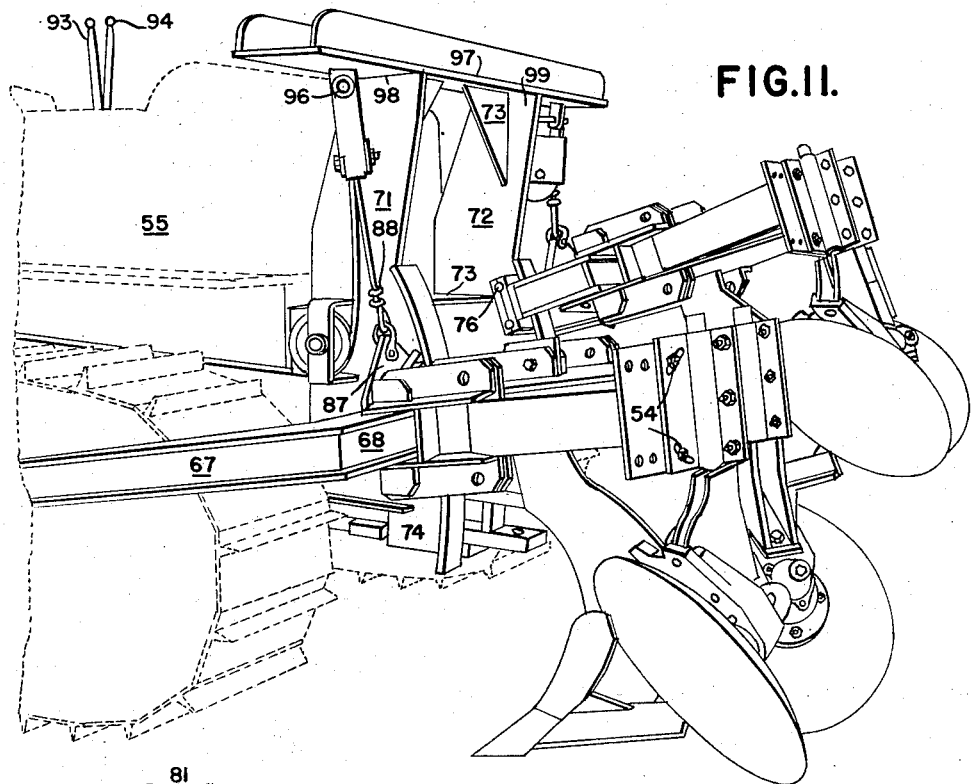
Figure 11 is a fragmentary perspective view of the pivoted tool carrier and tool bar as applied to a crawler type tractor.

The principal advantage to the split bar construction resides in the fact that upon one of the implement carriers being raised due to either striking an object embedded in the earth or due to the uneven contour of the land being worked, the other implements will remain in working engagement with and at working depth in the earth and continue unaffected. Heretofore with solid or unitary draw bar constructions this has been unattainable, as when one implement is disturbed all are disturbed or the affected implement is sheared or broken off. An example of the independent movement of the two halves of a split tool bar construction is shown in Figure 11.

Figure 12:
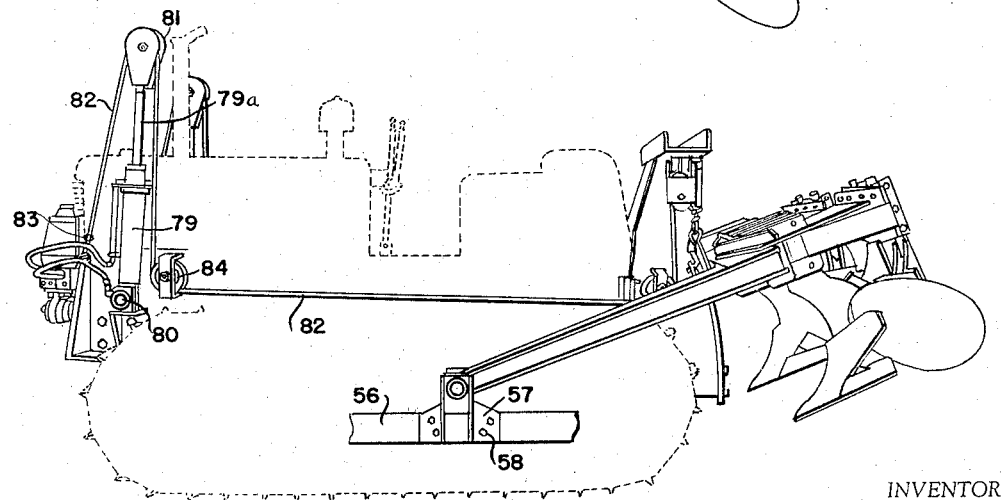
Figure 12 is a side elevational view of a crawler type tractor being fitted out with the pivoted tool carrier and tool bar for carrying same constructed in accordance with the present invention.

In order to drive the tractor from the barn or shed where the implement carrier is attached to the field area where the work is to be done it is necessary that the tool bar carrying the pivoted tool or implement carrier be elevated to clear the ground for over the road transportation as best seen in Figure 12. To raise and lower the draw bars an elevating and lowering mechanism is necessary. One form of such mechanism may consist of a hydraulic cable control in which a hydraulic cylinder 79 is pivotally secured at its lower end 80 to the front end of the tractor 55, see Figure 12. The cylinder 79 drives a piston rod 79a carrying at its free end a sheave 81 over which is passed a cable 82, one end of which is anchored to the tractor frame at 83 and the other end of which is rove over a sheave 84, thence over a sheave 85 carried by the plate 71, thence over the sheave 86 to an attaching tongue 87 secured to the foot portion 63 of the draw bar, where it is secured by cable clamps 88.

The hydraulic cylinders 79 receive their working fluid from a pump 89 driven from a forward extension of the tractor engine crank shaft which fluid is supplied from a hydraulic reservoir (not shown) by lines 90, 91 to the pump 89, control lines to control valves (not shown), actuated by levers 93, 94, thence to the cylinders 79 by lines 95. The sections of the split bar 22 may be independently or simultaneously raised or lowered by the movement of the levers 93, 94.

The sheave 86 is pivotally supported in journals 96 which are welded or otherwise secured to a truss plate 97 secured to the upper free ends 98, 99 of the plates 71, 72 bolted to the tractor frame.

Figure 13:
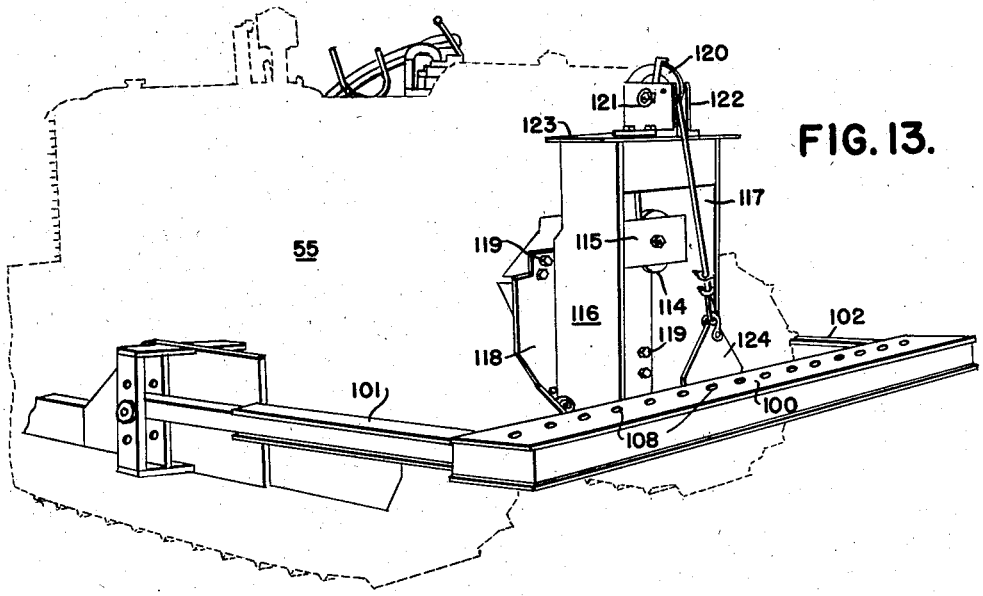
Figure 13 is a perspective view of a crawler type tractor fitted out with a single tool bar for carrying the pivoted tool carriers of the present invention.

The single or unitary tool bar for carrying the pivoted implement carrier is shown in Figures 13 and 14 in which the single tool bar is shown as applied to the small five ton HD5 crawler tractor. In this form of the invention the tool bar is of substantially a U-shape having a base 100 of generally hollow rectangular cross section, similar to that shown in Figure 4 of the split type bar, having arms 101, 102 extending off the base 100 at substantially a right angle and being parallel to one another. The free ends of the arms 101, 102 are pivotally connected to the tractor by pivots 103 carried by support plates 104, 105 welded to an attaching plate 106 which is adapted to be bolted to the tractor truck frame 107. In this form of tool bar the base 100 is provided with a plurality of in line openings 108 through which the pivot pin 26 of the implement carrier is adapted to pass in connecting the carrier to the tool bar.

In this form of the tool bar the elevating and lowering mechanism consists of but one cylinder 109 rigidly secured to the tractor frame, having a piston rod 110 with an eye 111 at its free end through which is connected one end of a cable 112, the other end of which is rove about a sheave 113 pivoted to the side of the tractor. The cable 112 is then rove over a sheave 114 rotatably secured to a plate 115 secured between a pair of bridge support plates 116, 117 which are welded to a tractor attaching plate 118 which in turn is bolted to the rear of the tractor frame as at 119. The cable is then rove over another sheave 120 rotatably supported between plates 121, 122, bolted or otherwise secured to a bridge support 123 welded to the upper free ends of the bridge support plates 116, 117. From the sheave 120 the cable is then secured to an attaching tongue 124 which is welded to the central forward portion of the base 100 of the tool bar.

Working fluid is placed in communication with the cylinder and piston 109, 110 through lines 125, 126, such fluid coming from a reservoir 127 and being subjected to the selective control of the elevating and lowering mechanism 128, through line 129.

In operation both the single or split form of tool bar cooperates with the implement carrier to raise it and its connected implements and to permit of limited horizontal pivotal movement of the implement carrier with respect to the tool bar due to the substantially flat extended surface contact between the flat surface of the top and bottom of the tool bar and the flat surface of the under side of the top plate 21, flat leading end of the front spacer plate 27, and the leading upper surface of the bottom plate 20 lying forwardly of the front spacer plate 27 to define a substantially normal U-shaped slot for receiving the rectangular tool bar. This construction because of the surface area of contact of materials reduces the likelihood of shearing of the pivot pin 26 upon raising or lowering the tool bar with an implement carrier pivoted thereto. The distance from the bottom of the top plate 21 to the top of the bottom plate 20 is slightly greater than the distance between the top of the tool bar plate 65 and the bottom of the tool bar plate 66 to permit of a snug fit between the tool bar and implement carrier without too much surface drag which would impede the attainment of a degree of horizontal pivotal movement of the carrier about the pivot pin 26 located by the in line openings 64 through the tool bar assembly. This construction and its pivotal movement is shown best in Figures 2 and 4.

The degree of pivotal movement of the implement carrier horizontally of the longitudinal axis of the draft of the carrier will be determined by the distance of the displacement of the center lines of the openings 64 in the tool bar and the rear ends of the plates 65, 66 on the one hand and the distance of displacement of the center line of the openings of the bosses 41 opening 24, 25 in the plates 20, 21 of the implement carrier and the front surface of the front spacer plate 27, as set out in Figures 4 and 5 on the other hand. I have found in practice that a pivotal movement horizontally of the longitudinal axis of draft of from 2 to 20 degrees can be obtained and that such angle may of necessity be varied in working different soils having varying degrees of compaction and in soils containing a high rock content. The further the front spacer plate 27 is displaced rearwardly of the pivot bosses 41 the greater will be the angle of horizontal pivot.

Subject to the limitations imposed by the use of discs on the implement carrier set out herein before the carrier will naturally seek a depth of penetration of its attached tools which will permit the draw bar to assume a substantially parallel line of draft with respect to the surface of the treads of each crawler unit. In some instances, in a level field this would be horizontal but it would not necessarily be true in a hilly terrain. The closer the carrier and draw bar approach parallelism with the treads of the crawler the greater will be the efficiency of the implements. The use of implements having shanks which may be axially slid through the sockets 28, 29 and 35 in the carrier, the openings 33 through the shanks 34 and the openings 38 in the implement retaining plates 30, 31 and 36 carried by the carrier permit the adjustment of the height of the implements. The openings 33 in the shank 34 of the implement to be selected will be determined by the soil conditions encountered; and the draw bar horsepower rating of the tractor to which this invention has been attached.

The tool carrier is attached to the tool bar 22 by a single pin 26 which allows it to pivot from one side to the other, thereby taking the rigidity out of the tools 34 and allowing the carrier to follow the contoured furrow without damaging the tools. The tool carrier itself has four distinct positions where tools can be mounted to form the different combinations. (1) Is a subsoiler pocket at 28 on the right; (2) is a center pocket 35; (3) is a left pocket 29 (4) the discs mounted on the disc mounting plate 45. The first three positions vary in measurement for the width of furrow. The plate 45 is positioned about a foot and a half rearwardly of the pockets and the disks mounted thereon are for the purpose of forming banks.

The four positions for mounting tools makes it possible for the operator to combine tools of various kinds in various combinations to accomplish the following operations, either singly or in any two or more operations simultaneously: subsoiling, subsoiling before plowing, subsoiling and raising irrigation banks, applying anhydrous ammonia, stubble shave and raise banks, weeding sugar cane irrigation banks, making furrows and applying dry fertilizer. The top surface of the tool carrier is so arranged that a fertilizer distributor can be mounted thereon for the application of dry fertilizer.

Most tool bars mounted on crawler tractors are of the rigid type which are low in construction cost and are exceptionally cheap to maintain. The rigid type means a tool bar which has a raised and lowered position but no independent lateral action is provided for the tools carried by the tool bar so that when one tool hits an object all tools are moved because the whole bar shifts from side to side. In the tool constructed in accordance with the present invention only one set of implements on a single tool carrier will move as each tool carrier is individually pivoted to the tool bar or draft member. Therefore one of the features in this bracket or carrier is that each set of tools, whether a tractor is carrying one or more of these units, is individually pivoted and striking an object with one will not affect the other, consequently, more even work is done.

Although I have disclosed herein the best form of the invention known to me at this time, I reserve the right to all such modifications and changes as may come within the scope of the following claims.

What is claimed is:

1. For use with a drawbar having a tool carrier attaching portion with substantially flat upper and lower surfaces, a tool carrier comprising top and bottom plates, front and rear spacer plates maintaining said top and bottom plates in spaced relation, said front spacer plate being secured to said top and bottom plates rearwardly of the leading edges of said top and bottom plates to define therewith a substantially open ended rectangular slot adapted to snugly receive therein the tool carrier attaching portion of the drawbar, means for pivoting said carrier to said drawbar whereby the terminus of said drawbar is slightly forward of said front spacer plate to permit of limited lateral swinging movement only therebetween, said top and bottom plates having central and lateral tool receiving pockets therein lying between said front and rear spacer plates, tool anchoring means carried by said top and bottom plates and being adjacent said tool receiving pockets, and strengthening means secured to said top and bottom plates and to said tool anchoring means for imparting rigidity thereto.

2. A tool carrier as claimed in claim 1 wherein said tool anchoring means consists of pairs of plates extending above and below said top and bottom plates at the sides of said tool receiving pockets and said plates are provided with openings therethrough to receive tool retaining bolts and nuts adapted to pass through the shank of the tools received within said pockets.

3. A tool carrier as claimed in claim 2 further comprising a disc attaching plate secured to said carrier rearwardly of said rear spacer plate and disc standard clamping means adapted to be received and retained on said disc attaching plate.

References Cited in the file of this patent

UNITED STATES PATENTS

| | | |
|---|---|---|
| 1,035,039 | Paul | Aug. 6, 1912 |
| 1,065,883 | Manfull | June 24, 1913 |
| 1,085,190 | Bennett | Jan. 27, 1914 |
| 1,225,853 | Pidgeon | May 15, 1917 |
| 1,663,249 | Graham | Mar. 20, 1928 |
| 1,760,940 | English | June 3, 1930 |
| 1,765,746 | Stubenberg | June 24, 1930 |
| 2,190,452 | Kerber | Feb. 13, 1940 |
| 2,304,376 | Ramsey | Dec. 8, 1942 |
| 2,388,689 | Hebert | Nov. 13, 1945 |
| 2,556,748 | Buckley | June 12, 1951 |
| 2,562,486 | Denning | July 31, 1951 |
| 2,645,043 | Booton et al. | July 14, 1953 |
| 2,660,938 | Kaupke | Dec. 1, 1953 |
| 2,693,748 | Kiser | Nov. 9, 1954 |
| 2,697,973 | Silver et al. | Dec. 28, 1954 |
| 2,757,593 | Bowman | Aug. 7, 1956 |